US009797475B2

(12) United States Patent
Altamura

(10) Patent No.: US 9,797,475 B2
(45) Date of Patent: Oct. 24, 2017

(54) EPICYCLIC TRANSMISSION

(71) Applicant: GE AVIO S.R.L., Rivalta di Torino (IT)

(72) Inventor: Paolo Altamura, Monopoli (IT)

(73) Assignee: GE AVIO S.R.L., Rivalta di Torino (IT)

( * ) Notice: Subject to any disclaimer, the term of this patent is extended or adjusted under 35 U.S.C. 154(b) by 160 days.

(21) Appl. No.: 14/721,992

(22) Filed: May 26, 2015

(65) Prior Publication Data
US 2015/0345591 A1 Dec. 3, 2015

(30) Foreign Application Priority Data

May 27, 2014 (IT) .............................. TO2014A0421

(51) Int. Cl.
*F16H 57/04* (2010.01)
*F16H 1/28* (2006.01)
*F16H 57/08* (2006.01)

(52) U.S. Cl.
CPC ......... *F16H 1/2836* (2013.01); *F16H 57/043* (2013.01); *F16H 57/0479* (2013.01); *F16H 57/082* (2013.01); *F16H 2057/085* (2013.01)

(58) Field of Classification Search
CPC ............. F16H 2057/085; F16H 1/2836; F16H 57/0479; F16H 57/082
See application file for complete search history.

(56) References Cited

U.S. PATENT DOCUMENTS

| | | | | |
|---|---|---|---|---|
| 2,591,734 A * | 4/1952 | Smith | ................... | F16H 1/2809 475/346 |
| 2,749,778 A * | 6/1956 | Kuhn | ................... | F16H 1/2809 475/344 |
| 3,635,103 A * | 1/1972 | Monti | ................... | F16C 23/10 384/255 |
| 7,806,799 B2 * | 10/2010 | Smook | .................. | F16H 1/2836 475/344 |
| 8,298,114 B2 * | 10/2012 | Lopez | ................... | F16H 1/2836 475/347 |
| 2011/0105270 A1 * | 5/2011 | Matsuoka | ................. | F02C 7/36 475/331 |
| 2012/0277056 A1 * | 11/2012 | Erno | ..................... | F16H 1/2836 475/331 |

FOREIGN PATENT DOCUMENTS

| | | |
|---|---|---|
| GB | 691 775 A | 5/1953 |
| WO | 2013/065024 A1 | 5/2013 |

OTHER PUBLICATIONS

Italian Search Report dated Jan. 23, 2015 as received in Application No. IT TO20140421.

* cited by examiner

*Primary Examiner* — Stacey Fluhart
(74) *Attorney, Agent, or Firm* — Maschoff Brennan

(57) ABSTRACT

An epicyclic transmission has a sun gear rotating about a transmission axis, a planet carrier provided with a plurality of tenons, which extend along respective supporting axes, and a plurality of planet gears meshing with the sun gear and supported by the tenons, by means of the interposition of bearings which allow the planet gears to rotate about respective rotation axes, parallel to the transmission axis; the inner rings of the bearings are coupled to the tenons in a swiveling manner by means of joint devices defined by cylindrical hinges which hinge about hinge axes which are fixed with respect to the tenons and lay on a plane orthogonal to the transmission and rotation axes.

11 Claims, 3 Drawing Sheets

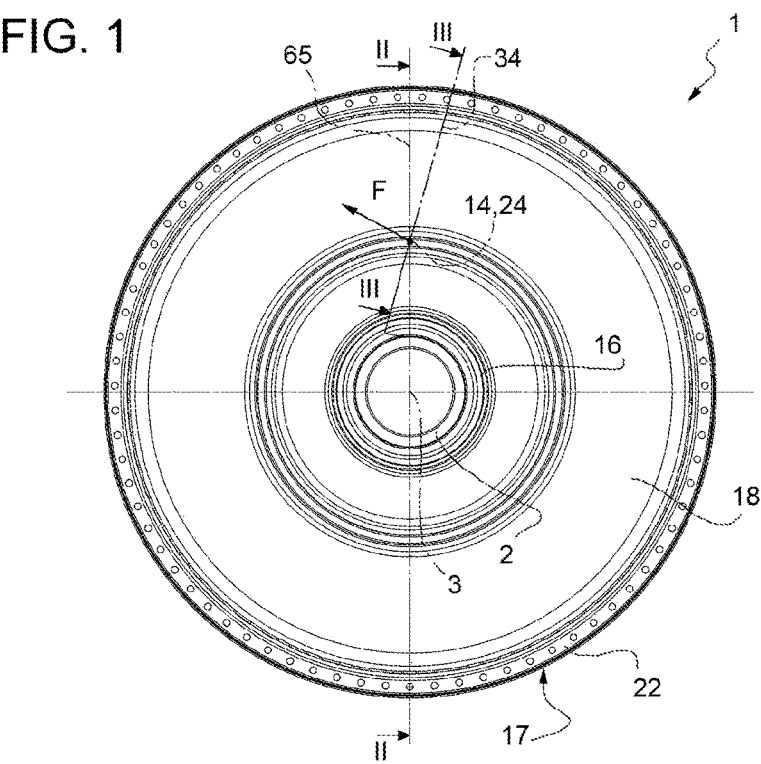
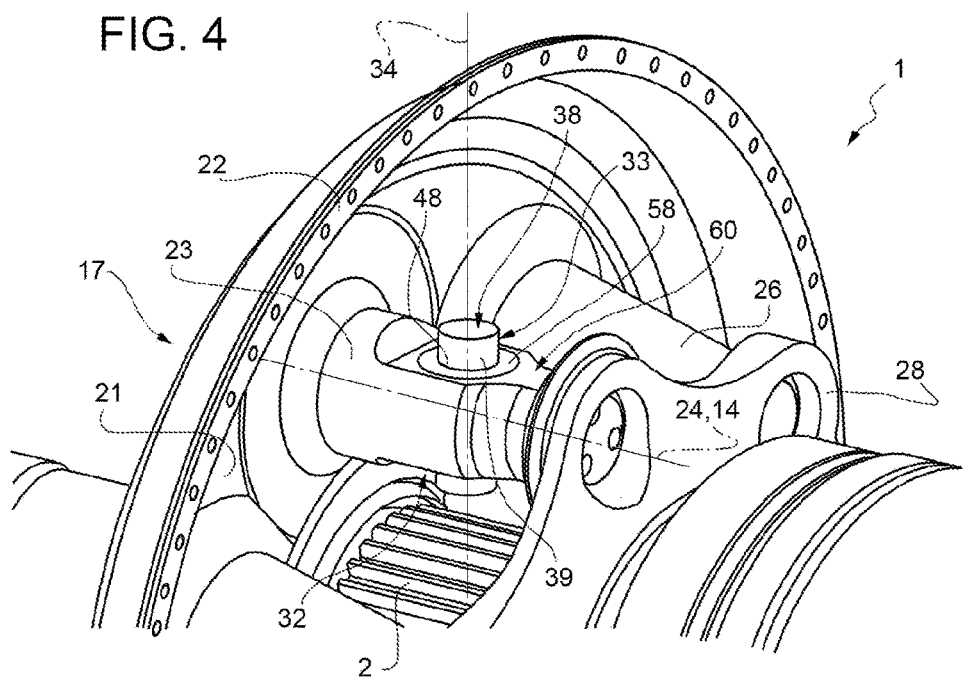

EPICYCLIC TRANSMISSION

The present invention relates to an epicyclic transmission.

BACKGROUND OF THE INVENTION

As known, an epicyclic transmission comprises a sun gear, a ring gear and a plurality of planet gears, which are interposed between the sun gear and the ring gear and are supported by a planet carrier. A transmission of this type can transmit motion between coaxial shafts, rotating at different speeds, and is very effective in implementing such a function while keeping weight and cost low. Epicyclic transmissions are widely used also in aeronautic engines, e.g. to transmit motion to the fan in turbofan engines.

In most applications, the planet carrier is of the asymmetric type, i.e. comprises two substantially plate-like elements arranged on parts axially opposite to the planet gears and fixed to each other by means of a plurality of crossbars or tenons. One of the two plate-like elements is then integrally connected to a support structure, if the planet carrier is fixed.

Each planet gear is coupled to the planet carrier by means of a respective support pin, the opposite ends of which are inserted and locked in the plate-like elements. In particular, the planet gear is coupled to an intermediate portion of such a support pin by means of either a sliding bearing or a rolling bearing, e.g. of the roller type.

During the operation of the transmission, the forces transferred by the planet gears to the respective support pins in general deform the planet carrier, and consequently tend to cause a displacement of the two plate-like elements with respect to each other. The tenons and the supporting pins are both deformed as a result of such a displacement. In particular, the support pin axes pass from an ideal operating condition, coinciding with a resting condition, in which the axes themselves are parallel to the axis of the sun gear and of the ring gear, to a real operating condition, in which they are inclined by an angle other than zero, variable as a function of the entity of the transmitted forces, and thus of the deformation of the planet carrier.

This swiveling of the support pin axes, and thus of the rotation axes of the respective planet gears, with respect to a condition of parallelism with the axis of the ring gear and of the sun gear produces a lack of uniformity in the distribution of contact pressures in the meshing zones of the teeth of the planet gears with the teeth of the sun gear and of the gear ring. As a consequence, a general malfunction of the transmission and also rapid wear of the components, which are in contact and in relative motion within the transmission itself, occur.

In order to avoid these drawbacks, a ball joint is provided for each planet gear which couples the inner ring of the bearing with the support pin and tends to compensate for the difference of swiveling between the rotation axis of the planet gear and the axis of the support pin itself in some known solutions.

However, this type of solution is not satisfactory because the inner ring of the bearing rotates with respect to the support pin about the axis of the latter, at least in some operating conditions. It is appropriate to lock this relative rotation to prevent loss of function of the bearing, i.e. that of supporting the planet gear as it rolls. Such a function would instead be performed by another component, i.e. the ball joint, which is sized only to allow the self-alignment of the planet gear with the meshing zones.

Technical devices may be adopted to lock the relative rotation of the inner ring of the bearing with respect to the ball joint without losing the self-alignment function performed by the latter, but such technical devices tend to wear very prematurely and are thus not reliable, and above all increase complexity of the transmission.

SUMMARY OF THE INVENTION

It is the object of the present invention to make an epicyclic transmission having a respective joint for each planet gear, which allows to solve the problems illustrated above in simple and cost-effective manner, and preferably, is capable of supporting the centrifuge inertial actions in optimal manner if the planet carrier is rotating, and not of fixed type.

According to the present invention, an epicyclic transmission as disclosed in claim 1 is made.

BRIEF DESCRIPTION OF THE DRAWINGS

The invention will now be described with reference to the appended drawings which illustrate a non-limitative embodiment thereof, in which:

FIG. 1 is a rear view of a preferred embodiment of the epicyclic transmission according to the present invention;

FIG. 4 shows a perspective view of a detail of the transmission in FIG. 1 with parts removed for clarity.

DETAILED DESCRIPTION OF THE INVENTION

Figure 2:
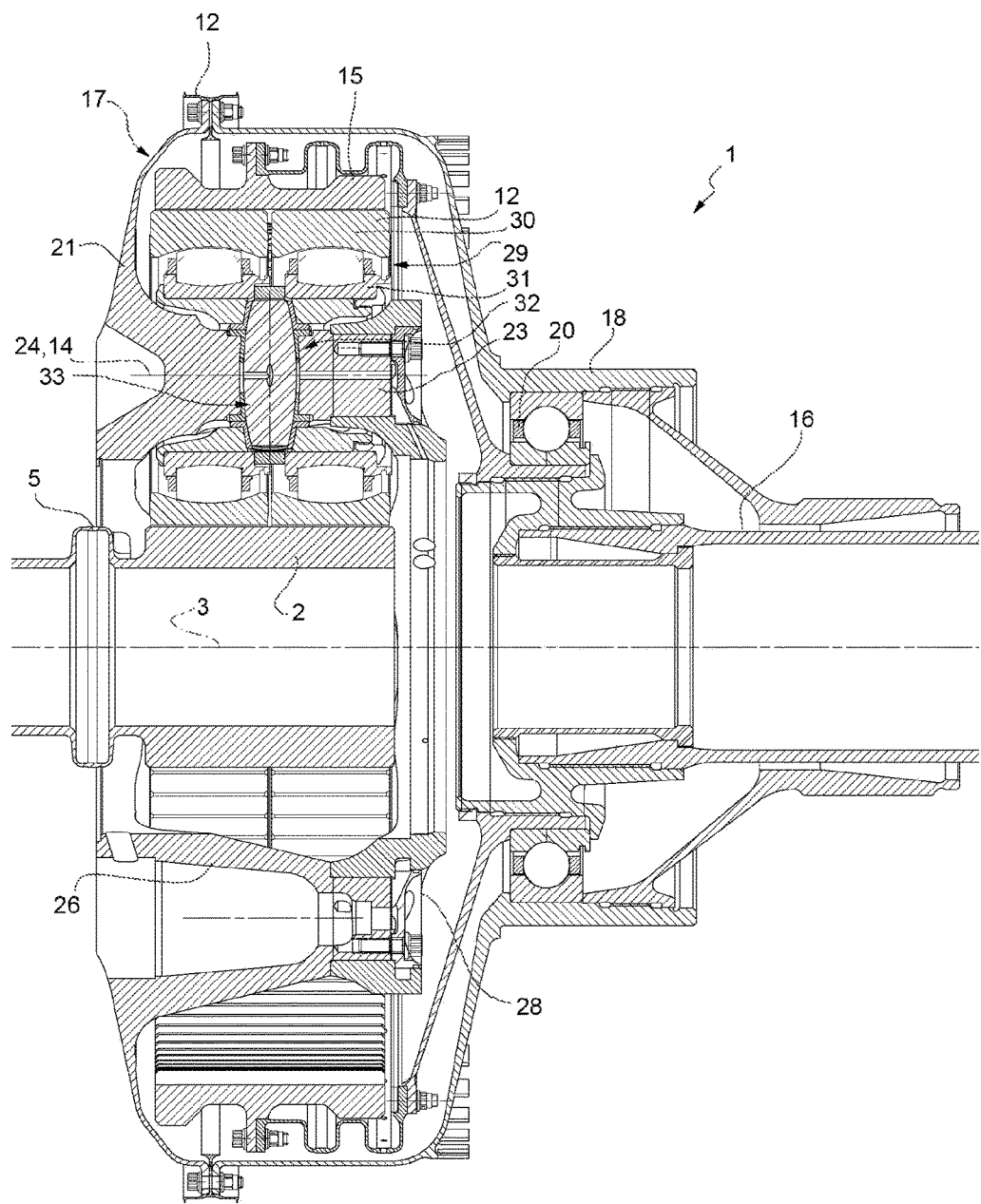
FIG. 2 is a section taken along meridian section plane II-II in FIG. 1.

With reference to FIGS. 1 and 2, reference numeral 1 indicates an epicyclic transmission, in particular for aeronautic applications, comprising a sun gear 2, which rotates about an axis 3 and is connected in angularly fixed manner to a transmission shaft 5.

The transmission 1 further comprises a plurality of planet gears 12, which mesh with the sun gear 2 and rotate about respective axes 14 (only one of which is shown in FIG. 2). The axes 14 are parallel and eccentric with respect to the axis 3 and, in particular, are angularly equally distanced from one another about the axis 3. Preferably, the transmission 1 has a pair of planet gears 12 which are coaxial with each of the axes 14.

Radially outwards, the planet gears 12 mesh with a ring gear 15, connected in angularly fixed manner to a transmission shaft 16, which is coaxial with the shaft 5 along axis 3 and is arranged on the axially opposite part with respect to the shaft 5. The planet gears 12 are supported by a planet carrier 17, which preferably rotates about the axis 3 and, for example, is connected in angularly fixed manner to a transmission member 18.

The transmission member 18 is coaxial with the shafts 5,16 and, in the particular illustrated example, is defined by a bell-shaped body, which is axially hollow and coupled to a portion of the shaft 16 by means of a rolling bearing 20.

According to variants (not shown), the relative arrangement of the shafts 5,16,18 could be different as a function of the specific applications of the transmission 1, for example the shaft of the planet carrier 17 could be arranged on the same side as the shaft 5.

Again with reference to FIG. 2, the planet carrier 17 is defined by a structure comprising an annular portion 21, which is coaxial with the sun gear 2, is substantially plate-shaped, axially faces the planet gears 12 and the ring gear 15 and is distanced from the shaft 5 and the sun gear 2. In particular, the annular portion 21 has an outer flange 22 arranged about the ring gear 15 and fixed to a corresponding flange of the bell-shaped body 18.

Furthermore, the planet carrier 17 comprises a plurality of pins or tenons 23 (only one of which is shown in FIG. 2). The tenons 23 extend from the annular portion 21 along respective axes 24, which in resting condition coincide with the axes 14.

The planet carrier 17 further comprises a plurality of hollow portions 26 (only one of which is shown in FIG. 2). The portions 26 overhangingly extend from the annular portion 21 in directions parallel to the axes 14 and in angular positions alternating with those of the tenons 23 about the axis 3. Preferably, the portions 26 are also made in one piece with the annular portion 21. On the side axially opposite to the annular portion 21, the planet carrier 17 further comprises an annular plate 28, fixed to the axial ends of the tenons 23 and of the portions 26.

The portions 26 have a stiffening function, so as to limit the tension of the tenons 23, and could be missing, according to variants (not shown).

The tenons 23 are preferably made in one piece with the annular portion 21 and support the planet gears 12 by means of respective bearings 29, preferably but not exclusively rolling bearings of the spherical roller type.

The bearings 29 comprise respective outer races or rings 30, which are fixed with respect to the toothings of the planet gears 12. Preferably, each planet gear 12 and the race 30 of the respective bearing 29 constitute a single body.

Figure 3:
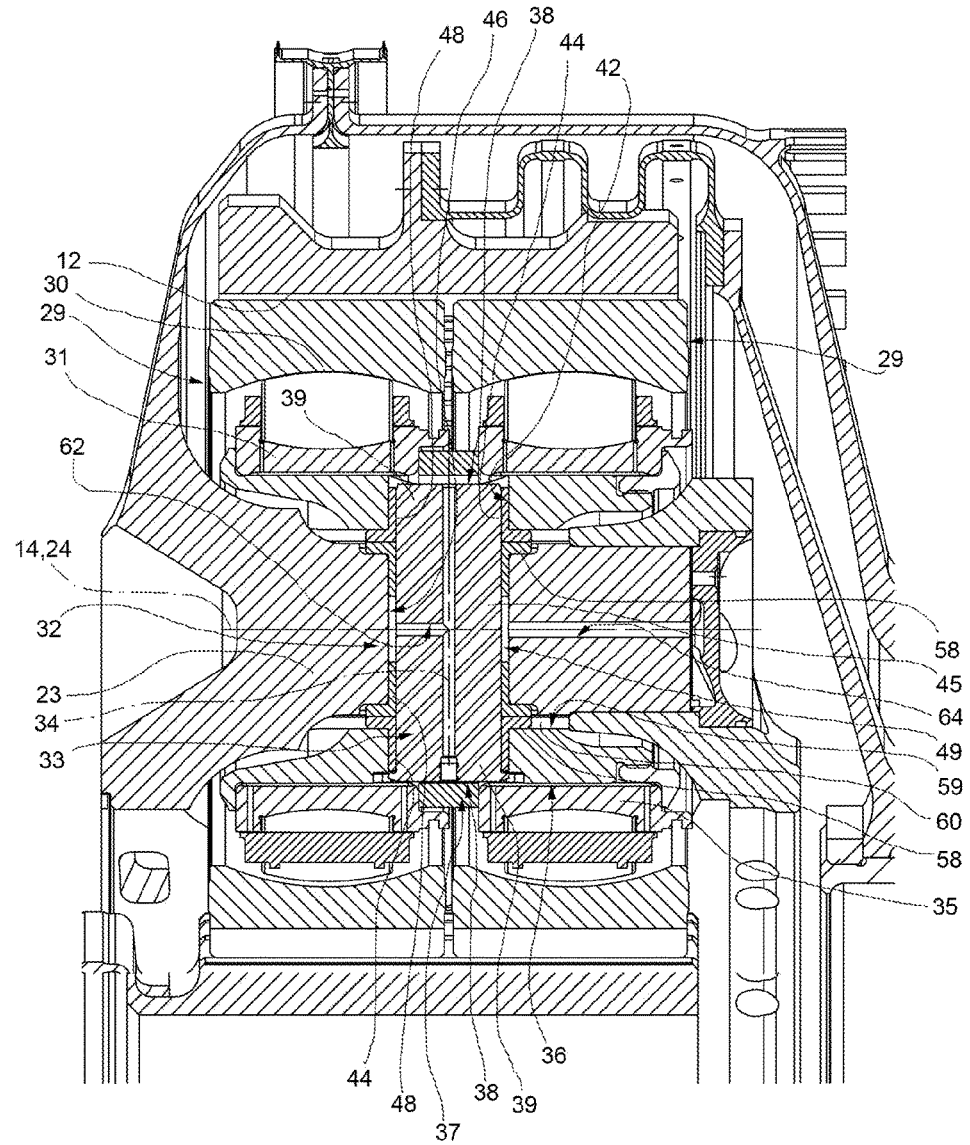
FIG. 3 is a section taken along section plane III-III in FIG. 1.

The bearings 29 further comprise respective inner races or rings 31, which are coupled to the tenons 23 by means of respective joint devices 32. As shown in FIG. 3, according to the present invention, the joint devices 32 are defined by cylindrical hinges, each having a hinge pin 33 extending along a hinge axis 34, which is fixed with respect to the corresponding tenon 23 and lays on a plane orthogonal to axes 3 and 24. By virtue of the hinge pins 33, the inner rings 31 and, thus, the axes 14, may swivel with respect to the tenons 23 and the axes 24, by rotating about the axes 34 automatically in response to the stress applied to the gears of the transmission 1, so as to make such stress uniform. Reference will be made in the following description to a single device 32, it being understood that the other devices 32 are identical.

The device 32 comprises a tubular support body 35 engaged by the tenon 23 with clearance and hinged to the tenon 23 about the axis 34. In particular, the support body 35 has a hole 42 extending along the axis 34 and constituted by two hinge seats, which are diametrically opposite and engaged by cylindrical ends 39 of the hinge pin 33, preferably by means of the interposition of bushings 44.

The support body 35 has an outer side surface 36, on which the inner rings 31 of two bearings 29 are fitted in fixed position. These two inner rings 31 are arranged side-by-side along the axis 14, but are axially distanced and/or shaped so as to define therebetween an annular lubrication channel 37, radially delimited inwards by the surface 36 and by two faces 38 which axially define the ends 39.

Preferably, the hinge pin 33 is in one piece distinct from the tenon 23 and comprises an intermediate portion 45 engaging a hole 46, which extends in through manner along the axis 34 through the tenon 23 itself.

The outer cylindrical surface of the intermediate portion 45 is coupled to the inner surface of the hole 46, preferably by means of two bushings 48, which are coaxial with each other and distanced from each other along axis 34, so as to define therebetween an annular lubrication channel 49. Radially, the channel 49 is delimited by the inner surface of the hole 46 and by the cylindrical outer surface of the intermediate portion 45.

For each of the ends 39, the device 32 comprises at least one spacer ring 58, which is fitted on the end 39 itself, is arranged at the outlet of the hole 46, and is interposed between an inner surface 59 of the support body 35 and an outer side surface 60 of the tenon 23. In this manner, the spacer rings 58 guarantee the correct clearance between the surfaces 59,60.

Preferably, at each end 39, there are two spacers 58, one defined by an outer flange integral with an end edge of the bushing 48 and the other defined by an outer flange integral with an end edge of the bushing 44. Advantageously, the material of which the bushings 44,48 and their flanges 58 are made is such as to reduce the rotation friction about the axis 34 between the support body 35, the hinge pin 33 and the tenon 23.

The hinge pin 33 has at least one inner passage 62, which departs from the outer cylindrical surface of the intermediate portion 45 and ends at the faces 38, so as to put the channel 49 into communication with the channel 37. In particular, the channel 49 receives lubrication oil through at least one passage 64 (not described in detail) made within the tenon 23.

The illustrated example, as mentioned above, refers to the case in which the planet carrier 17 is rotating. Advantageously, in such a case, the axis 34 of the hinge pin 33 is inclined with respect to a direction 65 (FIG. 1) which is coplanar to the axes 34 and is radial to the axes 24 and 3.

The angle formed by the axis 34 with respect to direction 65 is established in the step of designing so that the resultant force F discharged on the hinge pin 33 is radially direct with respect to the axis 34 and, thus, is orthogonal to the outer cylindrical surface of the ends 39. As known, the resultant F is due to the combination of the meshing loads transmitted by the ring gear 15 and by the sun gear 2 to the toothing of the planet gear 12 (such loads are tangential, and thus orthogonal to direction 65) and of the force due to the centrifuge inertial actions of the planet gear 12 (this force is radially directed outwards, i.e. along direction 65). By calculating such forces in design, at a given rotation speed (e.g. in full-rate condition), it is possible to identify the direction and sense of the resultant F and thus to swivel the axis 34 so as to satisfy the aforementioned perpendicularity requirement.

If the planet carrier 17 is fixed, the force due to the centrifuge inertial actions of the planet gear 12 is zero, so that the resultant F is tangential to axis 3, and the axis 34 coincides with direction 65.

According to a variant (not shown), the device 32 also applies to solutions in which each tenon 23 supports a single planet gear 12.

Regardless of the number of planet gears 12 mounted on each tenon 23, the hinge pin 33 is preferably in a position which is central along axis 24 with respect to the width of the meshing zone of the toothings between sun gear 2 and planet gears 12, and consequently such a meshing zone is symmetric with respect to the axis 34. This axial position of the hinge pin 33 prevents the onset of tipping moments on the planet gears 12 which are mounted on each tenon 23.

During the step of assembling, after having fitted the support body 35 on the tenon 23, the hinge pin 33 is inserted in the bushings 44,48 along the axis 34, like a "wrist pin". After such an insertion, the bearings 29 are fitted and fixed on the surface 36 complete with planet gear 12.

According to a variant (not shown and less convenient), the ends 39 may be made in one piece with the tenon 23, and the support body 35 may be made in one or more pieces which are assembled to one another during the step of assembling of the device 32 so as to define the cylindrical hinge between the support body 35 and the ends 39.

From the above, it is apparent that the particular connection which is achieved between the planet carrier 17 and the planet gears 12 by means of the cylindrical hinges 32 allows to keep the correct alignment between the toothings of the planet gears 12 and the toothings of the sun gear 2 and the ring gear 15, in any load condition and/or regardless of the geometric errors (consequent to the inevitable machining tolerances).

Indeed, in operating conditions, the tenons 23 tend to be deformed under load, mainly in tangential direction, but such a deformation does not cause any misalignment of the axes 14 of the planet gears 12, unlike what occurs in the solutions of the prior art free from joints, because the device 32 allows an automatic adaptation with different swiveling between the axes 14 and 24.

By virtue of this automatic adaption, no disuniformity is generated in the distribution of the contact pressures between the toothing of each planet gear 12 and the toothings of the sun gear 2 and of the ring gear 15, so that the device 32 guarantees a better overall reliability of the transmission 1 and/or the possibility of sizing the gears for less strict threshold requirements, with consequent reduction of the dimensions and/or of the weight of the transmission 1.

With respect to known solutions with ball joint, the ends 39 of the cylindrical hinge keep the inner rings 31 in a fixed angular position about axis 24 with respect to the tenon 23, without needing further additional angular locking components.

Furthermore, the presence of the bushings 44,48 allows, on one hand, to reduce the friction in the coupling zones between the hinge pin 33 and the tenon 23 and, on the other hand, to define the channel 49, which allows to lubricate the coupling zones easily. Furthermore, the inner passage 62 can transfer lubricant oil towards the outside of the support body 35 in relatively simple manner without lubrication holes in the latter so as to be able to lubricate the bearings 29.

It is then apparent that the claimed solution has a relatively low number of components, is relatively compact and allows to assemble the components of the devices 32 in relatively simple, quick manner.

Additionally, in the case of rotating planet carrier 17, by appropriately varying the axis 34 with respect to direction 65 during the step of designing, it is possible to achieve that, at a given rotation speed, the resultant F is perpendicular to the outer cylinder surface of the ends 39 of the hinge pin 33: in practice, this swiveling allows not to transfer loads according to the axis 34 between surfaces 59 and 60.

From the above, it is apparent that changes and variations may be made to the transmission 1 without because of this departing from the scope of protection of the appended claims.

For example, the epicyclic transmission could be constructively and/or functionally different from the transmission 1 described and illustrated by way of example.

As mentioned above, each tenon 23 could support a single bearing 29 and/or a single planet gear 12; and/or the support body 35 and the inner race 31 of the bearings 29 could form a single part instead of being distinct pieces fixed to one another.

The bearings 29 could be of the sliding type, instead of having rolling bodies between the outer 30 and inner races 31.

The invention claimed is:

1. An epicyclic transmission comprising:
   a sun gear rotating about a transmission axis;
   a planet carrier comprising a plurality of tenons, which extend along respective supporting axes;
   a plurality of planet gears meshing said sun gear and supported by said tenons;
   a plurality of bearings for coupling said planet gears to said tenons and allowing said planet gears to rotate about respective rotation axes, which are parallel to said transmission axis; said bearings comprising respective inner rings;
   joint means for coupling said inner rings to said tenons in a swiveling manner;
   wherein said joint means are defined by cylindrical hinges which hinge said inner rings to said tenons about hinge axes which are fixed with respect to said tenons and lay on a plane orthogonal to said transmission and rotation axes such that said inner rings each rotate about said respective hinge axes.

2. An epicyclic transmission according to claim 1, wherein said hinge axes are arranged in a central location along said rotation axes with respect to a width of a meshing zone defined by a toothing of said planet gears.

3. An epicyclic transmission according to claim 1, wherein said planet carrier is rotational about said transmission axis, and wherein each of said hinge axes is inclined with respect to a corresponding direction which lays on said plane and is radial with respect to said rotation and transmission axes.

4. An epicyclic transmission according to claim 1, wherein said cylindrical hinges comprise:
   respective support bodies, which are tubular, are fitted with clearance about said tenons and are fixed with respect to said inner rings; and
   respective hinge pins which protrude from said tenons along said hinge axes and engage respective seats of said support bodies.

5. An epicyclic transmission according to claim 4, wherein said hinge pins are separate from said tenons and engage respective holes made in said tenons.

6. A transmission according to claim 5, wherein:
   said cylindrical hinges comprise a plurality of bushings fitted about said hinge pins, and
   each of said cylindrical hinges comprises a pair of bushings of the plurality of bushings, which are arranged between the corresponding tenon and an intermediate portion of the corresponding hinge pin, are coaxial and spaced apart from each other along said hinge axis, and define an annular lubrication channel therebetween.

7. An epicyclic transmission according to claim 6, wherein each of said hinge pin has an inner passage, which departs from said annular lubrication channel, splits in two, and ends at two opposing faces which axially define the ends of the said hinge pin.

8. An epicyclic transmission according to claim 4, wherein said support bodies are tubular bodies different from said inner rings.

9. An epicyclic transmission according to claim 4, wherein said cylindrical hinges comprise respective bushings fitted about said hinge pins.

10. An epicyclic transmission according to claim 4, wherein said cylindrical hinges comprise respective spacers interposed between said support bodies and said tenons along said hinge axes.

11. An epicyclic transmission according to claim 1, wherein each of said cylindrical hinges comprises a cylindrical hinge pin which protrudes from a respective one of said tenons along said hinge axis and is coaxial with said hinge axis.

\* \* \* \* \*